(12) United States Patent
Gupta et al.

(10) Patent No.: US 10,440,276 B2
(45) Date of Patent: Oct. 8, 2019

(54) GENERATING IMAGE PREVIEWS BASED ON CAPTURE INFORMATION

(71) Applicant: Adobe Inc.

(72) Inventors: Subham Gupta, Uttarakhand (IN);
Poonam Bhalla, New Delhi (IN);
Krishna Singh Karki, New Delhi (IN);
Ajay Bedi, Himachal Pradesh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/801,836

(22) Filed: Nov. 2, 2017

(65) Prior Publication Data

US 2019/0132520 A1    May 2, 2019

(51) Int. Cl.
*H04N 5/232* (2006.01)
*H04N 5/262* (2006.01)
*H04N 1/21* (2006.01)
*G06K 9/66* (2006.01)

(52) U.S. Cl.
CPC .......... *H04N 5/23293* (2013.01); *G06K 9/66* (2013.01); *H04N 1/2112* (2013.01); *H04N 5/23216* (2013.01); *H04N 5/2628* (2013.01)

(58) Field of Classification Search
CPC ............. H04N 5/23293; H04N 1/2112; H04N 5/23216; H04N 5/2628; H04N 5/23212; H04N 5/232125; H04N 5/232127; G06K 9/66
See application file for complete search history.

(56) References Cited

U.S. PATENT DOCUMENTS

| | | | |
|---|---|---|---|
| 2003/0025812 A1* | 2/2003 | Slatter | H04N 5/23222 348/240.2 |
| 2010/0039525 A1* | 2/2010 | Steinberg | H04N 5/232 348/222.1 |
| 2011/0116726 A1* | 5/2011 | Hosaka | G06T 5/003 382/255 |
| 2012/0294514 A1* | 11/2012 | Saunders | G06K 9/00677 382/159 |
| 2013/0101210 A1* | 4/2013 | Tang | G06K 9/3233 382/165 |
| 2015/0117783 A1* | 4/2015 | Lin | G06K 9/4671 382/195 |
| 2018/0150433 A1* | 5/2018 | Sowden | G06F 3/0481 |

* cited by examiner

*Primary Examiner* — Nicholas G Giles
(74) *Attorney, Agent, or Firm* — Keller Jolley Preece

(57) ABSTRACT

Methods, systems, and non-transitory computer readable storage media are disclosed for generating focused preview images that include the subjects of interest of digital images. For example, in one or more embodiments, the disclosed system utilizes a machine-learning model to generate a saliency map for a digital image to indicate one or more salient objects portrayed within the digital image. Additionally, in one or more embodiments, the system identifies a focus region based on focus information captured by a camera device at the time of capturing the digital image. Furthermore, the system can then utilize the saliency map and the focus region to generate a focused preview image. For instance, in one or more embodiments, the system crops the digital image based on an overlapping portion of the saliency map and the focus region to generate a focused preview image.

20 Claims, 11 Drawing Sheets

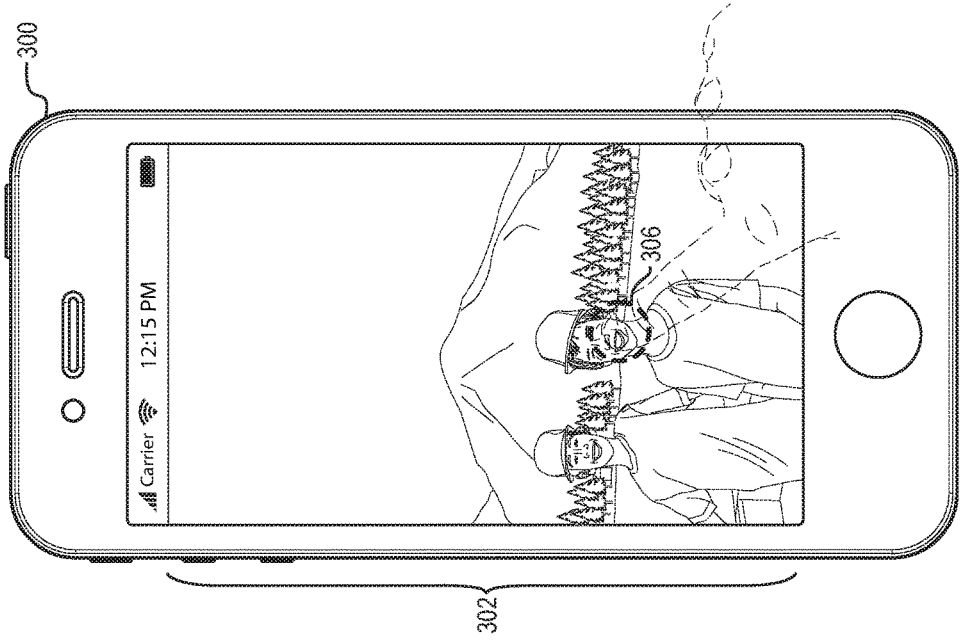
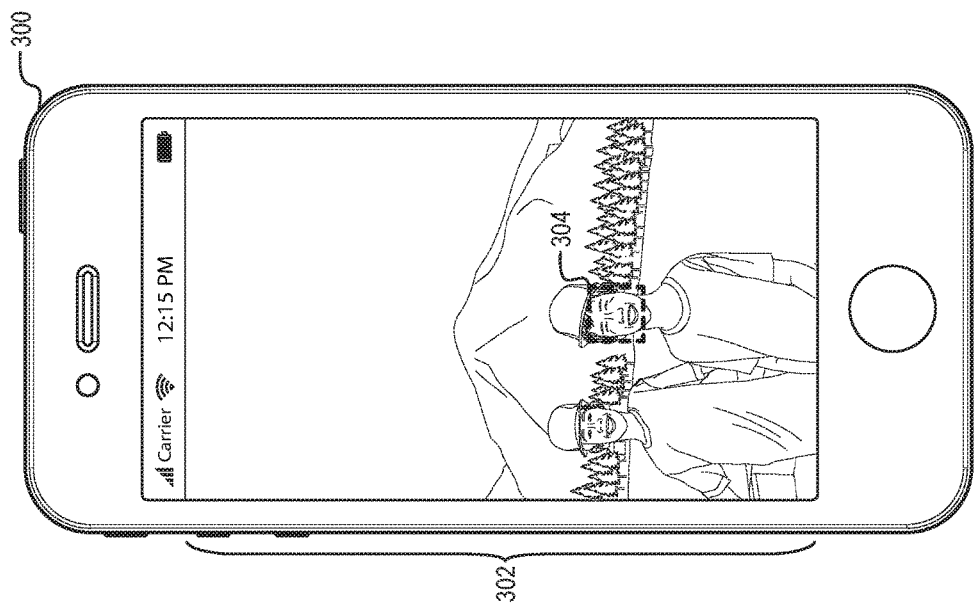

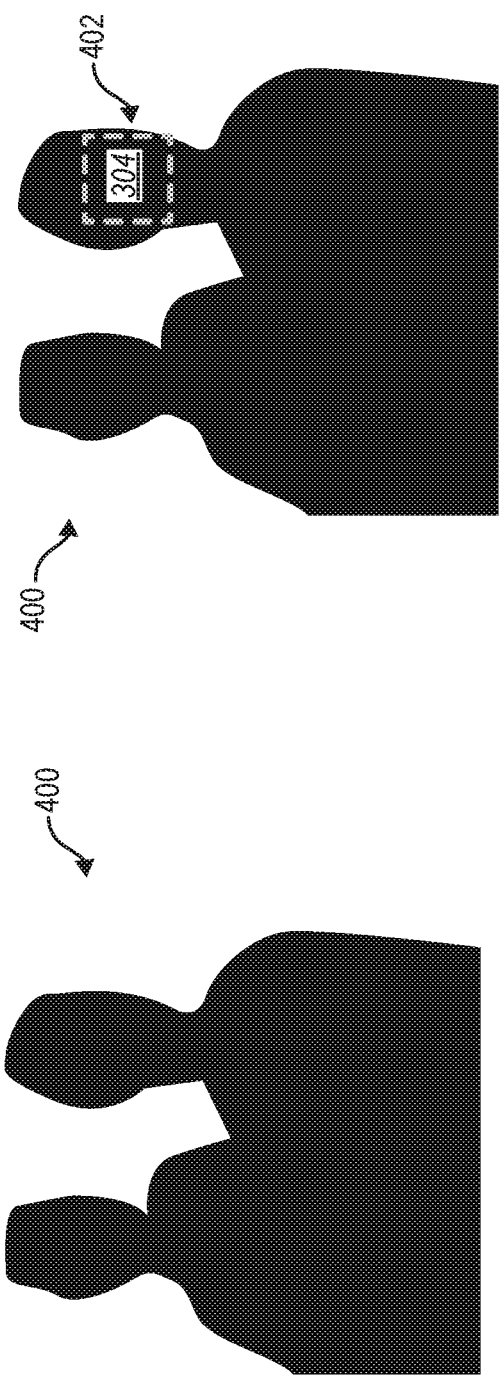

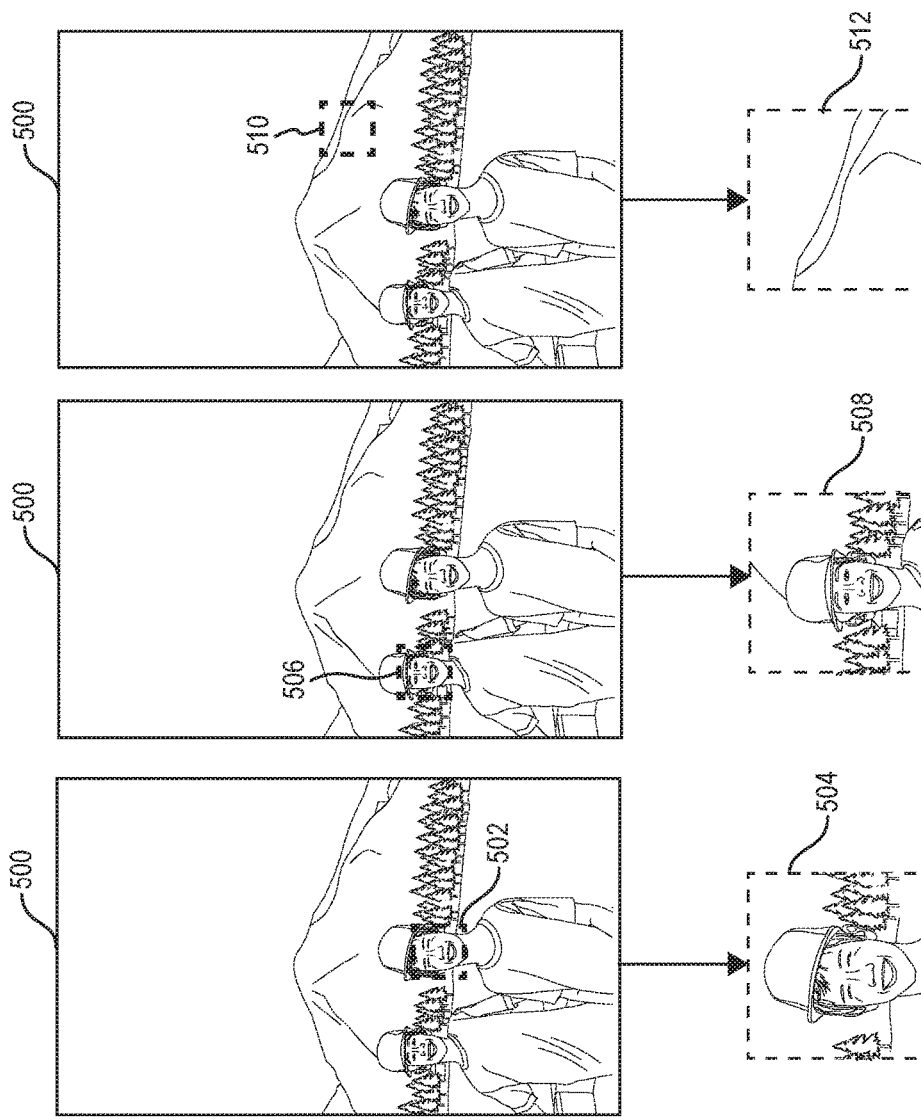

GENERATING IMAGE PREVIEWS BASED ON CAPTURE INFORMATION

BACKGROUND AND RELEVANT ART

The increased prevalence and technical capabilities of smartphone cameras and other portable camera devices has dramatically increased the ease with which people can capture digital photographs and videos. Indeed, many smartphone users often capture hundreds or thousands of digital visual media items each year, resulting in tens of thousands of digital visual media items stored on smartphones, personal computers, or cloud storage devices. The expanding volume of digital images captured and stored by users makes it increasingly difficult to browse, search, and otherwise manage personal digital image repositories.

To assist in managing captured digital images, conventional systems typically allow users to browse the users' digital images within an image application. In particular, some conventional systems create thumbnail or preview versions of the digital images to display a plurality of digital images in a limited visual space, such as a digital photo catalog. For example, conventional systems often crop the digital images to create preview images of one or more predetermined sizes (e.g., square thumbnails). Thus, conventional systems are able to condense the images to save visual space and maximize the number of thumbnails shown per page.

While conventional systems can provide a useful layout with an aesthetically pleasing, easily reviewable format, these systems often generate thumbnails by cropping to the centers of the digital images. This approach, however, fails to account for the interests of the user that captured the digital images. In particular, users often employ photographing techniques that place the subjects of interest in a digital image away from the center of the digital image. Accordingly, thumbnails generated by conventional systems frequently exclude subjects of interest from the original digital images. For example, applying conventional systems to a digital image that portrays a person along one side of the digital image often results in a thumbnail that partially or fully removes the person from view. Cropping the subjects of interest from the thumbnails can make it difficult for users to determine the content of digital images and manage repositories of digital visual media.

These and other disadvantages exist with respect to conventional image management systems.

SUMMARY

One or more embodiments provide benefits and/or solve one or more of the foregoing or other problems in the art with systems, methods, and non-transitory computer readable storage media for generating intelligent personalized preview digital images. In particular, in one or more embodiments, the disclosed system generates a saliency map that indicates one or more likely prominent or important objects portrayed within a digital image. Furthermore, in one or more embodiments, the disclosed system identifies focus information captured by a camera device at the time that the digital image was captured. For example, the disclosed system can identify focus information that indicates an object or a distance to which the camera device was focused when capturing the digital image. The disclosed system can then identify a subject of interest within the digital image based on the focus information and the saliency map. For example, the disclosed system can identify a subject of interest by determining an overlapping portion of the saliency map and a focus region identified based on the focus information. By identifying the subject of interest corresponding to the overlapping portion, the disclosed system is able to generate a focused preview image that depicts the intended subject of interest from the digital image.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIGS. 3A-3B illustrate user interfaces for providing focus information when capturing digital images in accordance with one or more embodiments;

FIGS. 4A-4D illustrate a process for generating a focused preview image utilizing a saliency map and focus information for a digital image in accordance with one or more embodiments;

FIGS. 5A-5C illustrate examples of different focused preview images for a single digital image in accordance with one or more embodiments;

DETAILED DESCRIPTION

Figure 1:
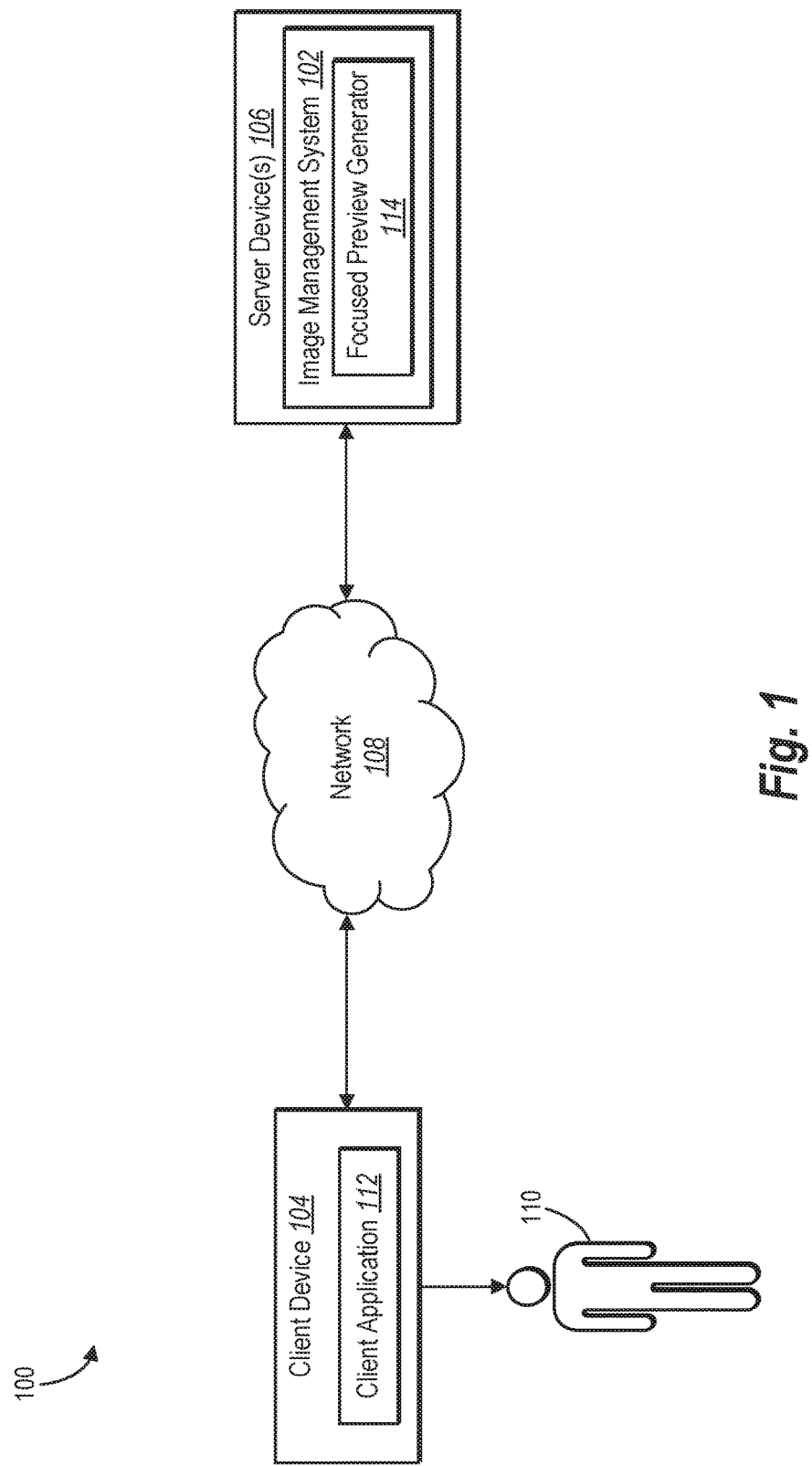
FIG. 1 illustrates an environment in which an image management system can operate in accordance with one or more embodiments.

One or more embodiments of the present disclosure include an image management system that generates personalized preview images for digital images based on focus information captured at the time of capturing the digital images. Specifically, the image management system can identify, for the digital images, focus information captured by a camera device of the user when the user captures the digital images. By using the focus information to identify one or more objects on which the user intended to focus the camera device within the digital images, the image management system can generate focused preview images (e.g., thumbnails) that depict the subjects of interest to the user from the digital images.

To illustrate, in one or more embodiments, the image management system applies a machine-learning model to a digital image to generate a saliency map (e.g., a map reflecting salient objects in the digital image). In addition, the image management system identifies focus information for the digital image. Specifically, the image management system can identify focus information determined by a camera device at a time that the digital image was captured, such as touch input from a user indicating an object on which the camera device focused in capturing the digital image. Furthermore, the image management system can generate a focused preview based on the saliency map and the focus information. For instance, the image management system can crop a digital image to generate a focused preview image based on a correspondence between the saliency map and the focus information.

As just mentioned, in one or more embodiments, the image management system generates a saliency map utilizing a machine-learning model. For instance, the image management system can generate a salience map by utilizing a machine-learning model trained based on a plurality of digital training images and training saliency maps. In particular, in one or more embodiments, the image management system trains the machine-learning model using a plurality of training digital images that have a variety of objects, backgrounds, and other visual elements for learning to identify salient objects within digital images. Furthermore, the image management system can train the machine-learning model using training saliency maps (e.g., manually created ground truth maps reflecting salient objects within the training digital images). Upon training the machine-learning model, the image management system can use the machine-learning model to automatically generate saliency maps for digital images associated with a user.

As mentioned above, in one or more embodiments, the image management system also identifies focus information for digital images. In particular, the image management system can identify focus information generated at the time when a camera device captures the corresponding digital image. For instance, when the user captures a digital image, the image management system can utilize a camera device to capture the focus information by determining a distance, object, or area on which the camera device is focused. Similarly, focus information can include data from an autofocus feature of the camera device or data reflecting user interaction with a camera device (e.g., manual selection of a region when capturing a digital image or a zoom operation performed by the user when capturing the digital image).

In one or more embodiments, the focus information can include (or be used to determine) a focus region. In particular, the image management system can utilize the focus information to determine a focus region that includes a pixel or a group of pixels in the digital image that reflect a subject of interest. Thus, for example, a focus region can include a region defined by an autofocus feature of the camera, a region selected by the user in capturing a digital image, or a region that a user zoomed toward in capturing a digital image.

Furthermore, in one or more embodiments, the image management system utilizes the saliency map and the focus information for a digital image to generate a focused preview image that includes the subjects of interest to the user. Specifically, the image management system can determine an overlapping portion between the focus region and the saliency map. For instance, the image management system can generate a focused preview image centered at the overlapping portion (subject to boundaries of the original digital image). Accordingly, the image management system can generate a plurality of focused preview images for digital images based on a correspondence between the focus information and prominent objects within the digital image.

By utilizing saliency maps and focus regions, the image management system is able to generate focused preview images (e.g., thumbnails) that are more indicative of important content in digital images. Indeed, by determining an intersection of a saliency map and focus information for a digital image, the image management system can provide a personalized preview that depicts subject(s) of interest to the user. For instance, by using information from the time of image capture, the image management system can more accurately detect subject(s) of interest and create a more useful and meaningful focused preview image than thumbnails generated by conventional systems. Generating focused preview images reflecting subjects in which the user is interested allows for easier and faster identification of digital images and more efficient management of high volume digital visual media repositories.

Furthermore, using focus information in combination with saliency maps can allow the image management system to more accurately organize and tag digital images. Specifically, by leveraging the intersection of focus information and saliency maps to detect the subjects in which a user is interested, the image management system can provide more useful information for tagging and cataloging the digital images. For instance, using image processing and machine-learning techniques, the image management system can organize digital images based on the subjects in which the user is interested. Using the intersection of the focus information and saliency maps as input into a machine-learning model that tags/catalogues images for searching and/or grouping of images improves existing image management systems.

Furthermore, utilizing focus information can allow the image management system to generate focused preview images with reduced processing requirements. Indeed, identifying focus information and determining focus regions based on activities at the time of image capture requires little computational intensity. Accordingly, the image management system can provide a significant improvement in generating focused preview images without expending significant computational resources.

Referring now to the figures, FIG. 1 illustrates an embodiment of an environment 100 in which an image management system 102 operates. In particular, the environment 100 includes a client device 104 and server device(s) 106 communicating over a network 108. Moreover, as shown, the client device 104 includes a client application 112. Furthermore, the server device(s) 106 include an image management system 102 which contains a focused preview generator 114. As mentioned above, the image management system 102 utilizing the focused preview generator 114 can analyze digital images and generate focused preview images based on focus information identified at the time of capturing the digital image.

As used herein, the term "digital image" refers to a visual representation captured using a digital camera device. For example, a digital image can include a photograph that a user captures using a camera device. Additionally, a digital image can include a visual representation stored in a digital image format (e.g., JPEG/JFIF, Exif, TIFF, GIF, BMP, PNG, PPM, PGM, PBM, PNM, WebP, HDR raster formats, HEIF, BAT, or BPG) that allows a computing device to interpret the digital image and display the digital image on a display device. Also, as used herein, the term "camera device" refers to a device that is capable of capturing digital images. For example, a camera device includes a digital camera sensor that converts captured light into a digital image. To illustrate, a camera device can include a smartphone camera device or a standalone camera device.

According to one or more embodiments, the image management system 102 is implemented in a cloud-based system that manages digital image storage for a user 110 associated with the client device 104. For example, the image management system 102 can provide image storage and management services for the user 110 by communicating with the client device 104 via the client application 112 operating on the client device 104. To illustrate, the client application 112 can provide digital images to the image management system 102 (e.g., after capturing the digital images), which can then store the digital images for later access by the user 110 via the client device 104 or via one or more other client devices. The image management system 102 can also allow users to share digital images with one another via the client application 112.

In one or more embodiments, the image management system 102 also stores metadata associated with the digital images. For instance, the client device 104 can capture focus information for digital images at the time the client device 104 captures the digital images. To illustrate, the client application 112 (or other application that captures images on the client device 104) can capture focus information in response to, or at the same time as, capturing a digital image. Furthermore, the client device 104 can store the focus information as metadata (e.g., Extensible Metadata Platform metadata) with the digital image and then send the metadata (including the focus information) to the image management system 102 with the digital image. Alternatively, the client device 104 can obtain the digital images (with the focus information as metadata) from a camera device that is separate from the client device 104.

As used herein, the term "focus information" refers to digital information that indicates a subject of interest within a digital image. In particular, the term "focus information" includes data captured by a camera device (i.e., other than a digital image itself) that indicates a subject of interest within a digital image. For instance, "focus information" includes data determined by a camera device at a time that a digital image is captured (other than the digital image itself) that indicates a subject of interest within the digital image. For example, focus information can indicate a distance, object, or area on which a camera device (e.g., the camera device 104) focuses when capturing a digital image. Indeed, focus information can indicate a particular area or distance to which a lens of the camera device is focused when capturing the digital image. Thus, focus information includes data from an autofocus feature of a camera device. As used herein, the term "autofocus feature" refers to an operation that a camera device performs automatically to focus a camera lens or sensor when capturing a digital image without user input. Moreover, focus information includes data from a zoom operation of a camera device in capturing a digital image. Further, focus information includes user interaction with a camera device in capturing a digital image (e.g., a touch point on an area of a display to indicate a focus point).

As mentioned above, focus information can include a focus region (and/or a focus region can be determined from focus information). As used herein the term "focus region" refers to one or more pixels corresponding to a subject of interest within a digital image as indicated by focus information. In particular, the term "focus region" indicates a collection of pixels within a digital image that corresponds to a subject of interest based on focus information. For example, a focus region can include a collection pixels (e.g., a point, box, or circle) defined as an area of focus via an autofocus feature of a camera device. Similarly, a focus region can include a point or region within a digital image corresponding to a zoom operation (e.g., a starting point of user input for a zoom operation or a central point of user input for a zoom operation). Similarly, a focus region can include one or more pixels corresponding to touch input (e.g., a group of pixels selected by a user in focusing the camera device). A focus region can also include one or more pixels corresponding to a user interaction with a digital image after the time of capture. For example, a client device can track user selections and/or zoom operations on a captured digital image. Thus, while focus information refers to digital information indicating a subject of interest, a focus region refers to a particular set of pixels in a digital image corresponding to the subject of interest.

As described above, focus information includes digital information captured at a time that a digital image is captured. As used herein, the term "time that a digital image is captured" (or "capture time" or "time when a digital image is captured") refers to a period of time when a user is utilizing a camera device to take a digital image. In particular, a capture time can include a period of time for setting up a camera device to take a digital image, opening/closing a shutter to detect light waves and generate a digital image, and putting away the camera device. For example, in applications where the digital camera is affixed to a smartphone (e.g., the client device 104), capture time can include the time period when a user opens a camera application to take a picture, adjusts parameters of the camera application (e.g., selects a focus point, adjusts a zoom level), orients the camera (e.g., initiates an autofocus feature), selects a capture element on the camera application interface, reviews the digital image (e.g., zooms in on a particular portion of the digital image), and/or closes the capture application. Similarly, for stand-alone camera devices that provide digital images to the client device 104, capture time can include a time period when a user turns the camera on, adjusts camera parameters (e.g., selects a focus point, adjusts a zoom level), orients the camera (e.g., initiates an autofocus feature), selects a capture element, reviews the digital image (e.g., via a display device of the camera), and/or turns the camera device off.

After capturing a digital image, the client device 104 can provide the digital image to the image management system 102. For example, the client device 104 can synchronize digital images with the image management system 102 according to an automated synchronization schedule or according to a user request to synchronize (or otherwise upload) digital images to the image management system 102. The client device 104 can also provide metadata associated with the digital images to the image management system 102, such as metadata including the focus information.

In one or more embodiments, the client device 104 includes a computing device that allows the user 110 to access and view digital images from the image management system 102. For example, the client device 104 can include a smartphone, tablet, desktop computer, laptop computer, or other device that is able to access the digital images data from the server device(s) 106 via the network 108 (e.g., any of the devices discussed below in reference to FIG. 10). The client device 102 can include one or more applications (e.g., client application 112) that display focused preview images and allow the user 110 to browse and select preview images for viewing full corresponding resolution digital images. For example, the client application 112 can include a software application running on the client device 104 (and/or hosted on the server device(s) 106) for viewing digital images stored on the image management system 102. The client application 112 can also allow the user 110 to share digital images with other users and view shared digital images from other users.

According to one or more embodiments, the image management system 102 performs operations associated with generating focused preview images of digital images received from the client device 104. In particular, the image management system 102 includes a focused preview generator 114 that generates saliency maps for the received digital images to determine salient objects within the digital images. For instance, the focused preview generator 114 can include, or communicate with, a machine-learning model that identifies salient objects within the digital images.

As used herein, the term "saliency map" refers to a digital item that defines salient objects within a digital image. In particular, a saliency map includes a digital item, such as a boundary, matrix, array, index, digital file, or set of pixels that indicate a salient object within a digital image. For example, a saliency map can include a map or binary mask that indicates a salient object using a first value (e.g., a "1" or "255") and non-object/background areas using a second value (e.g., a "0"). Additionally, as used herein, the term "salient objects" refers to an object of measurable distinctiveness in a region or scene (e.g., a scene portrayed in a digital image). Specifically, salient object includes pixels that reflect an object with distinctive perceptual qualities (e.g., color, focus, depth, and/or position) that make the item measurably different from background pixels in a digital image. Thus, a salient object can include a prominent and/or easily distinguishable object, an object of a certain type, an objects that is in the foreground of the digital image, etc.

As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, etc. Thus, a machine-learning model makes high-level abstractions in data by generating data-driven predictions or decisions from the known input data.

To illustrate, the machine-learning model described herein can be trained using a plurality of digital training images that include a variety of different backgrounds and objects and training saliency maps that allow the machine-learning model to learn how to identify prominent objects of an image given the variety of content digital images may contain. As used herein, and as will be described in more detail with respect to FIG. 2, "digital training images" refer to digital images that are utilized to train the machine-learning model. Additionally, as used herein, a "training saliency map" refers to a saliency map that is utilized to train the machine-learning model (e.g., saliency maps generated by a user and fed into the machine-learning model to allow the machine-learning model to test and improve its accuracy).

Upon generating a saliency map for a digital image utilizing a machine learning model, the focused preview generator 114 can utilize the saliency map and focus information to determine subjects of interest. Specifically, the focused preview generator 114 determines overlapping (i.e., intersecting) portions of focus regions and saliency maps to determine subjects of interest to the user. The focused preview generator 114 can then generate focused preview images using the determined overlapping portions. For example, the focused preview generator 114 can centers the focused preview images on the overlapping portions so that the focused preview images are useful to the user 110.

Additionally, as previously mentioned, the image management system 102 can generate focused preview images for the digital images. The image management system 102 can provide the focused preview images to the client device 104 for the user 110 to view using the client application 112. Specifically, the image management system 102 can send the focused preview images to the client device 104 (or other client devices associated with the user) via the network 108. For instance, the image management system 102 can communicate with the client device 104 to provide focused preview images for the digital images (e.g., in response to receiving the digital images from the client device 104). The client application 112 can then display the focused preview images as the user 110 browses or otherwise accesses the digital images from the image management system 102. The user 110 can also select focused image previews to view the full resolution (or higher resolution) digital images from the image management system 102.

Although the environment 100 of FIG. 1 is depicted as having various components, the environment 100 may have any number of additional or alternative components (e.g., any number of server devices, client devices, or other components in communication with the image management system 102). Accordingly, the image management system 102 can generate preview images for digital images from any number of client devices and/or in connection with any number of users. Furthermore, more than one component or entity in the environment 100 can implement the operations of the image management system 102 described herein. Indeed, the image management system 102 can alternatively be implemented entirely (or in part) on the client device 104 or as part of another component or system.

To illustrate, while FIG. 1 illustrates an embodiment in which the focused preview generator 114 is included as part of the image management system 102 on the server device(s) 106, one or more embodiments can include the focused preview generator 114 on the client device 104 as part of the client application 112. For instance, the image management system 102 can utilize the client device 104 to generate a saliency map. Accordingly, the focused preview generator 114 can then generate the focused preview image at the client device 104 using the focus information and the saliency map from the metadata. Additionally, each client device associated with the user can generate the focused preview images separately because each client device has access to the same metadata. For example, a plurality of client device may use different aspect ratios based on a size of their display devices, or based on whether the client devices are running a web application or a mobile application, etc.

Additionally, the client devices and/or the image management system can use the metadata for other purposes unrelated to generating focused preview images. To illustrate, the image management system 102 can use the focus information and the saliency map to improve an auto-crop feature (e.g., a feature that allows a user to auto-crop a digital image to a subject of interest without providing additional input). In particular, the image management system can receive a request to auto-crop the image, determine the overlapping portion of the saliency map and the focus region, and then crop the digital image (or provide a suggested cropping of the digital image).

Figure 2:
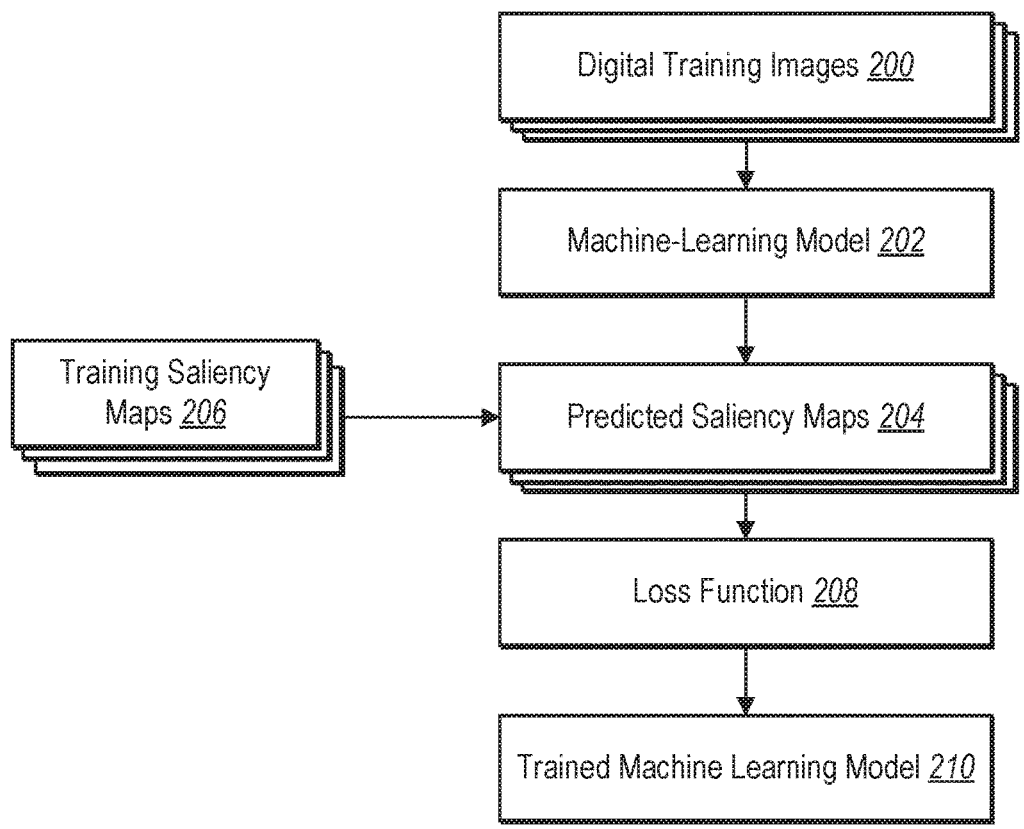
FIG. 2 illustrates a diagram of a process for training a machine-learning model with a plurality of training images and training saliency maps in accordance with one or more embodiments.

As mentioned briefly above, the image management system 102 can train a machine-learning model using digital training images and training saliency maps. FIG. 2 illustrates a diagram of a process for training a machine-learning model with training images and training saliency maps in accordance with one or more embodiments. In one or more embodiments, training the machine-learning model includes applying a machine-learning model to a plurality of digital training images 200, which can include a large number of images (e.g., 10,000 images). For example, the image management system 102 accesses an image repository comprising digital training images that one or more users or sources have previously captured and provided. In particular, the image repository can include a plurality of images that include different scenarios with a variety of objects in different numbers/positions and with different focus regions. Applying the machine-learning model 202 to a variety of scenarios allows the machine-learning model to more accurately identify subjects of interest in digital images.

As shown in FIG. 2, the image management system 102 trains the machine-learning model 202 by generating a plurality of predicted saliency maps 204 for the digital images in the training dataset. Specifically, the image management system 102 utilizes the machine-learning model 202 to generate a predicted saliency map 204 for each digital training image from the digital training images 200. For example, the machine-learning model 202 generates the predicted saliency map for a given digital training image using image processing techniques that allow the machine-learning model 202 to identify and analyze various features (at different levels of abstraction) within the digital training image. To illustrate, the machine-learning model 202 can identify shapes, colors, object boundaries, and other visual elements for distinguishing objects within the digital training image.

By analyzing features of the digital images 200 (e.g., at various levels of abstraction or depths within levels of a neural network) the machine-learning model 202 can create a predicted saliency map 204 for the digital training images 200. In particular, the machine-learning model can create the predicted saliency map 204 by assigning a first predicted value to pixels corresponding to salient objects within the digital training image. In one or more embodiments, the machine-learning model 202 assigns a second predicted value to pixels that are not part of the salient objects (e.g., assigns a "1" to an array for a pixel corresponding to a salient object and assigns a "0" to the array for a pixel that does not correspond to a salient object). The machine-learning model 202 thus creates a predicted saliency map 204 that contains predicted values corresponding to the pixels in the digital training image.

To verify the accuracy of the predicted saliency maps 204 for the digital training images 200 and further train the machine-learning model 202, the image management system 102 utilizes a plurality of training saliency maps 206 (e.g., training saliency maps created by one or more users or otherwise accessed by the image management system 102). For example, the image management system 102 can compare the predicted saliency maps 204 with the training saliency maps 206.

For instance, the machine-learning model can determine the differences between the predicted saliency maps 204 and the training saliency maps 206. In one or more embodiments, the image management system 102 determines the differences between the predicted saliency maps 204 and the training saliency maps 206 by utilizing a loss function 208. The loss function 208 can compare the predicted saliency maps 204 and the training saliency maps 206 and determine a measure of loss (i.e., a measure of difference, such as mean squared error or mean absolute loss). For example, the loss function 208 can determine a measure of loss for each pixel between the predicted value (i.e., the value from the predicted saliency map 204) and the actual value (i.e., the value from the training saliency map 206). Accordingly, the loss function 208 determines whether the predicted value for each pixel is correct in each digital training image 200 and what the correct value should be.

The image management system 102 uses the loss function 208 (e.g., the measure of loss resulting from the loss function 208) to train the machine-learning model 202. In particular, the image management system 102 can utilizes the loss function 208 to correct parameters that resulted in incorrect predicted values from the predicted saliency maps 204. The machine-learning model 202 can use the loss function 208 to modify one or more functions or parameters. Specifically, the machine-learning model 202 modifies one or more functions or parameters in its prediction algorithms to minimize the loss function 208 and reduce the differences between the predicted saliency maps 204 and the training saliency maps 206 for the digital training images 200. By minimizing the loss function 208, the machine-learning model 202 improves the accuracy of predicting whether pixels in an image belong to a salient object. Additionally, adjusting the machine-learning model 202 based on the loss function 208 results in a trained machine-learning model 210.

According to one or more embodiments, the image management system 102 can also provide a test dataset (e.g., a plurality of additional digital images) to allow the image management system 102 to verify the accuracy of the machine-learning model 202. For example, after training the machine-learning model 202 on the digital training images 200, the image management system 102 can use the test dataset to verify the accuracy of the model 202 at any time after training the machine-learning model 202.

Furthermore, although not illustrated in FIG. 2, in one or more embodiments, the image management system 102 can generate the training saliency maps 206 based on user input. For example, the training saliency maps 206 can include user-generated saliency maps for the digital training images 200. For example, a user can create a training saliency map 206 for a digital training image 200 by manually marking the salient objects within the digital training image 200. Alternatively, the user can view the predicted saliency map 204 for the digital training image 200 and then mark incorrectly predicted values (e.g., for individual pixels or for partial or whole objects) to create the training saliency map 206 for the digital training image 200. In one or more implementations, the user can use software that facilitates quick, manual marking of objects for a training saliency map 206 through the use of image processing techniques and intelligent selection tools.

Furthermore, as the image management system 102 generates saliency maps for digital images provided to the image management system 102 from one or more users and/or receives feedback from the one or more users, the machine-learning model 202 can continuously update to fine-tune the saliency map generation process. For instance, the image management system 102 can generate saliency maps for each digital image uploaded to the image management system 102 from a plurality of client devices. Additionally, the image management system 102 can generate focused preview images for the digital images from the plurality of client devices, and the corresponding users can provide feedback to correct erroneous identification of salient objects. When the image management system 102 generates the new saliency maps and/or receives feedback, the machine-learning model 202 can use the new maps/feedback to update the loss function, and thus update the machine-learning model 202 itself.

As described above, the image management system 102 can train the machine-learning model 202 using digital training images and training saliency maps. The image management system 102 can use any type of machine-learning techniques capable of predicting salient objects within digital images. According to various embodiments, the machine-learning model 202 uses supervised learning, unsupervised learning, or reinforcement learning. For example, the machine-learning model 202 can include, but is not limited to, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. In any case, the image management system 102 uses machine-learning techniques to continually train and update the machine-learning model 202 (or, in other words, to update the trained machine learning model 210) to produce accurate saliency maps based on the training saliency maps and feedback from users.

As mentioned previously, the image management system 102 can identify focus information corresponding to a digital image. In particular, the image management system 102 can identify focus information from a camera device at capture time for a digital image. FIGS. 3A-3B illustrate example graphical user interfaces for obtaining focus information for a digital image. Specifically, FIGS. 3A-3B illustrate various methods of determining a focus region in a digital image based on focus information obtained when capturing the digital image.

For instance, FIG. 3A illustrates a computing device 300 with a display screen portraying an image capture interface 302. As illustrated in FIG. 3A, the client device 300 is a smartphone with a camera device that includes a client application (e.g., the client application 112 of FIG. 1) that allows a user to capture digital images. The client application includes the image capture interface 302, which displays a digital representation of a real-world scene (e.g., a real-time feed portraying the real-world scene). Specifically, the image capture interface 302 displays a portion of the real-world scene as determined by the specifications of a camera sensor (e.g., size of the camera sensor). For example, the image capture interface 302 illustrates a portrait view of people with a mountain/forest backdrop. The client application generates a digital image when the user performs an action to capture the digital image based on the information displayed within the image capture interface 302 at the time of the performed action.

The user of the client device 300 intends to focus the camera device on one of the people visible within the image capture interface 302. Moreover, the client application includes an autofocus feature that allows the user to automatically focus on an object (e.g., an object portrayed within the image capture interface 302). In particular, the autofocus feature causes the client device 300 to focus at a distance associated with an object portrayed within the image capture interface 302 without user input with the image capture interface 302. For instance, the client application can use image processing (e.g., object recognition, location analysis, and/or movement tracing) while tracking the real-time feed of images captured by the camera device to automatically and dynamically identify people, faces, or other objects on which the user likely intends to focus and to automatically and dynamically modify one or more lenses of the digital camera to change focus of the camera.

Furthermore, the client application can provide a visual indicator an area where the autofocus feature is focusing in the digital image. For example, the client application can provide a box, circle, or other interface element in the image capture interface 302 around the area that the autofocus feature is focusing in the digital image.

The image management system 102 can utilize data from the autofocus feature as focus information for the digital image. Indeed, the image management system 102 can utilize objects, distances, and/or areas determined by an autofocus feature as focus information for determining a focused preview image. For example, when the client device 300 captures the digital image (i.e., based on the visible portion of the scene within the image capture interface 302), the client device 300 also captures the focus information. For example, the client device 300 can capture information from the autofocus feature that indicates at least one pixel that corresponds to a location within the digital image at which the client device 300 focused. More specifically, the focus information indicates at least one pixel corresponding to an object in the real-world scene on which the client device 300 focused when capturing the digital image.

According to one or more embodiments, the image management system 102 determines a focus region 304 based on the focus information. The focus region 304 can include one or more pixels of the digital image corresponding to the object, distance, or location at which the client device 300 focused. In one or more embodiments, the focus region 304 is the same pixel(s) as determined by the client device 300 when capturing the digital image. For example, as mentioned above, the client application can provide a visual indicator of an area for display via the image capture interface 302. The image management system 102 can utilize the data defining the visual indicator as the focus region 304 (e.g., a square focus area within the digital image). For example, the image management system 102 can receive the focus information from the client device 104 with the digital image and determine that the pixel(s) in the original focus information is the focus region 304. Thus, the image management system 102 may determine the focus region 304 without additional processing.

Alternatively, the focus region 304 can include a region that the image management system 102 determines based on additional analysis of the focus information. Specifically, the focus region 304 can include a predetermined number of pixels that is different than the originally identified focus information. For example, the focus region 304 can include a square that is a different size than a square utilized by an autofocus feature of the client device 300. To illustrate, the image management system 102 can increase or decrease the size of the square initially captured by the client device 300 while maintaining a common center. In another example, the focus region 304 can include a pixel which the image management system 102 expands to include a square, rectangle, or other shape with the pixel(s) at the center.

In one or more embodiments, the image management system 102 determines the focus region 304 from a plurality of separate focus regions. In particular, a camera device may identify a plurality of separate areas associated with a plurality of different objects on which to focus while capturing the digital image. For example, the camera device can identify a plurality of separate faces within the image capture interface 302 and then determine how to focus the image based on the plurality of separate faces. The image management system 102 may access the focus information, identify the areas corresponding to for the plurality of separate faces to determine the focus region for generating a focused preview image.

To illustrate, the image management system 102 may select the focus region based on an area from the focus information that is closest to a center point or center line of the digital image. Alternatively, the image management system 102 may select a focus region after generating the saliency map for the digital image (e.g., based on how much various areas of the focus information regions overlap the saliency map), as described in more detail below. In another example, the image management system 102 can select a focus region based on the types of objects to which areas of focus information belong. For example, if a first focus region corresponds to a person and a second focus region corresponds to an inanimate object, the image management system 102 can select the first focus region corresponding to the person. The image management system 102 can also select a focus region based on a plurality of criteria, such as the criteria listed above.

As one can appreciate, a camera device can change focus while a user moves the camera device. For example, as a user moves the client device 300, the autofocus feature can change the focus from a first object to a second object. The image management system 102 can use the shifting of focus from the first object to the second object when generating a focused preview image. For example, the image management system 102 can determine that an initial autofocus target (e.g., the first object) was not used for focusing the camera lens/sensor when capturing the digital image. The image management system 102 can then access the focus information to generate the focused preview image based on the camera device shifting focus away from the first object.

While FIG. 3A illustrates that the image management system 102 can determine a focus region 304 based on focus information obtained using an autofocus feature associated with a camera device, the image management system 102 can also determine a focus region based on user input. For example, FIG. 3B illustrates that the client application allows a user to manually select a focus region 306 within the image capture interface 302. Specifically, FIG. 3B illustrates that a user can provide an input to the image capture interface 302 such as a touch input on a touchscreen of the client device 300.

The client device 300 can detect the position of the input to the image capture interface 302 and use the position of the input to determine how to focus a camera lens/sensor when capturing the image. To illustrate, the client device 300 can detect an object in the real-world scene based on the position of the input within the image capture interface 302 and focus the camera lens/sensor on the object (e.g., at a distance corresponding to the object). Furthermore, the client device can store the position of the input in metadata for the digital image captured by the client device 300 as focus information. The image management system 102 uses the stored focus information to determine a focus region 306, as previously described with reference to focus information using the autofocus feature.

In one or more embodiments, the image management system 102 uses the focus information stored by the client device 300 when capturing the digital image to determine the focus region 306. In particular, the focus information stored in response to a user input can include, or be based on, a shape of the touch input on the touchscreen of the client device 300. For example, the shape of the touch input can include a contact area of the touch input, such as the surface area of a finger of the user in contact with the touchscreen of the client device 300. Alternatively, the shape of the touch input can be a shape (e.g., a circle, as illustrated) with a predetermined size centered at the touch input (e.g., centered at a pixel in the center of the touch input). In yet another example, the client device 300 can store a single pixel in the center of the touch input as the focus information.

After determining the focus information based on the user input, the image management system 102 can determine the focus region 306. For example, the image management system 102 can determine the focus region 306 to be the focus information stored with the digital image (e.g., a pixel, a shape of the touch input, or the shape with the predetermined size centered at the touch input). Alternatively, the image management system 102 can determine the focus region 306 by determining a new shape based on the stored focus information. To illustrate, the image management system 102 can determine the focus region 306 by selecting an area of predetermined size centered on the shape of the touch input, or on a center of the shape of the touch input.

Once the image management system 102 has determined a focus region for a digital image, or prior to determining the focus region for the digital image, the image management system 102 identifies the salient objects within the digital image. Specifically, the image management system 102 generates a saliency map for the digital image that indicates one or more important or prominent objects within the digital image. Using the saliency map and the focus information, the image management system 102 can generate a focused preview image that highlights the salient objects (e.g., by centering the focused preview image on the salient object(s)). FIGS. 4A-4D illustrates a process of generating a saliency map for a digital image and then generating a focused preview image for the digital image.

With reference now to FIG. 4A, the image management system 102 generates a saliency map 400 for the digital image illustrated in FIGS. 3A-3B. In particular, the image management system 102 generates the saliency map 400 by identifying one or more salient objects within the digital image. As previously described with respect to FIG. 2, the image management system 102 can generate the saliency map 400 using a machine-learning model trained on a plurality of training images and training saliency maps. For example, the image management system 102 can input the digital image into the machine-learning model, and the machine-learning model can output a saliency map 400 for the digital image. Alternatively, the image management system 102 can use another method for generating the saliency map 400 using an object recognition process and depth detection analysis of the image.

In one or more embodiments, the saliency map 400 that the image management system 102 generates includes a plurality of values corresponding to pixels of the digital image. Specifically, the saliency map 400 includes a single value for each pixel within the digital image such that the saliency map 400 includes as many values as there are pixels within the digital image. The values within the saliency map 400 indicate whether the corresponding pixels are part of salient objects. Accordingly, the image management system 102 assigns a value to a pixel based on whether the image management system 102 determines that the pixel belongs to a salient object.

For instance, if the pixel belongs to a salient object, the image management system 102 can assign the pixel a value of "1" to indicate that the pixel is part of a salient object. Conversely, if the pixel does not belong to a salient object, the image management system 102 can assign the pixel a value of "0" to indicate that the pixel is not part of a salient object, or vice versa. Alternatively, the image management system 102 can assign different values to the pixels to indicate whether the pixels belong to salient objects within the digital image. In another example, the image management system 102 can assign values to only the pixels belonging to salient objects while leaving the values of the other pixels unassigned.

As illustrated, generating the saliency map 400 involves identifying a plurality of objects from the digital image of FIGS. 3A-3B. While analyzing the digital image, the image management system 102 can determine that objects in the foreground are salient objects while objects in the background are not salient objects. Specifically, the salient objects include people in the foreground of the digital image. Additionally, the image management system 102 can determine that the mountain range and trees, etc. in the background of the digital image are not salient objects. Accordingly, generating the saliency map 400 includes assigning a first value to pixels corresponding to the people in the foreground of the digital image and assigning a second value to pixels corresponding to the remainder of the digital image. The resulting saliency map 400 appears as a mask with a first color (e.g., black) corresponding to the first value and a second color (e.g., white) corresponding to the second value.

After generating the saliency map 400, the image management system 102 determines the subject of interest of the user who captured the digital image to determine how to create a focused preview image that reflects the subject of interest. More specifically, the image management system 102 detects the subject of interest by determining whether, and where, the saliency map 400 and the identified focus region from the focus information overlap. As described previously, determining the focus information captured at the time of the image capture can often indicate the object(s) in which the user was interested when the user captured the digital image. Thus, by determining where the saliency map and the focus information overlap, the image management system 102 is more accurately able to identify a specific object (or objects) on which the user was attempting to focus the camera device.

FIG. 4B illustrates the saliency map 400 with the focus region 304 of FIG. 3A determined for the digital image. As mentioned, the image management system 102 can determine the focus region 304 prior to, concurrent with, or after generating the saliency map 400. Once the image management system 102 has the saliency map 400 and the focus region 304, the image management system 102 can then determine whether they overlap and generate the focused preview image. As illustrated, the focus region 304 overlaps a portion of the saliency map 400. The overlapping portion 402 in this case is equal to the focus region 304 as a whole because the entire focus region 304 overlaps with the saliency map.

In other instances, only a portion of the focus region 304 may overlap with the saliency map 400. For instance, if the determined focus region 304 only partially overlaps with an object when a user captures the digital image, the resulting overlapping portion between the saliency map 400 and the focus region 304 may include only a portion of the focus region. By determining that the saliency map 400 and the focus region 304 at least partially overlaps, the image management system 102 can identify the subject of interest within the digital image. Thus, even if the focus region is not entirely positioned over an object within the digital image, the image management system 102 can still focus on the salient object within the digital image.

Figures 4C, 4D:
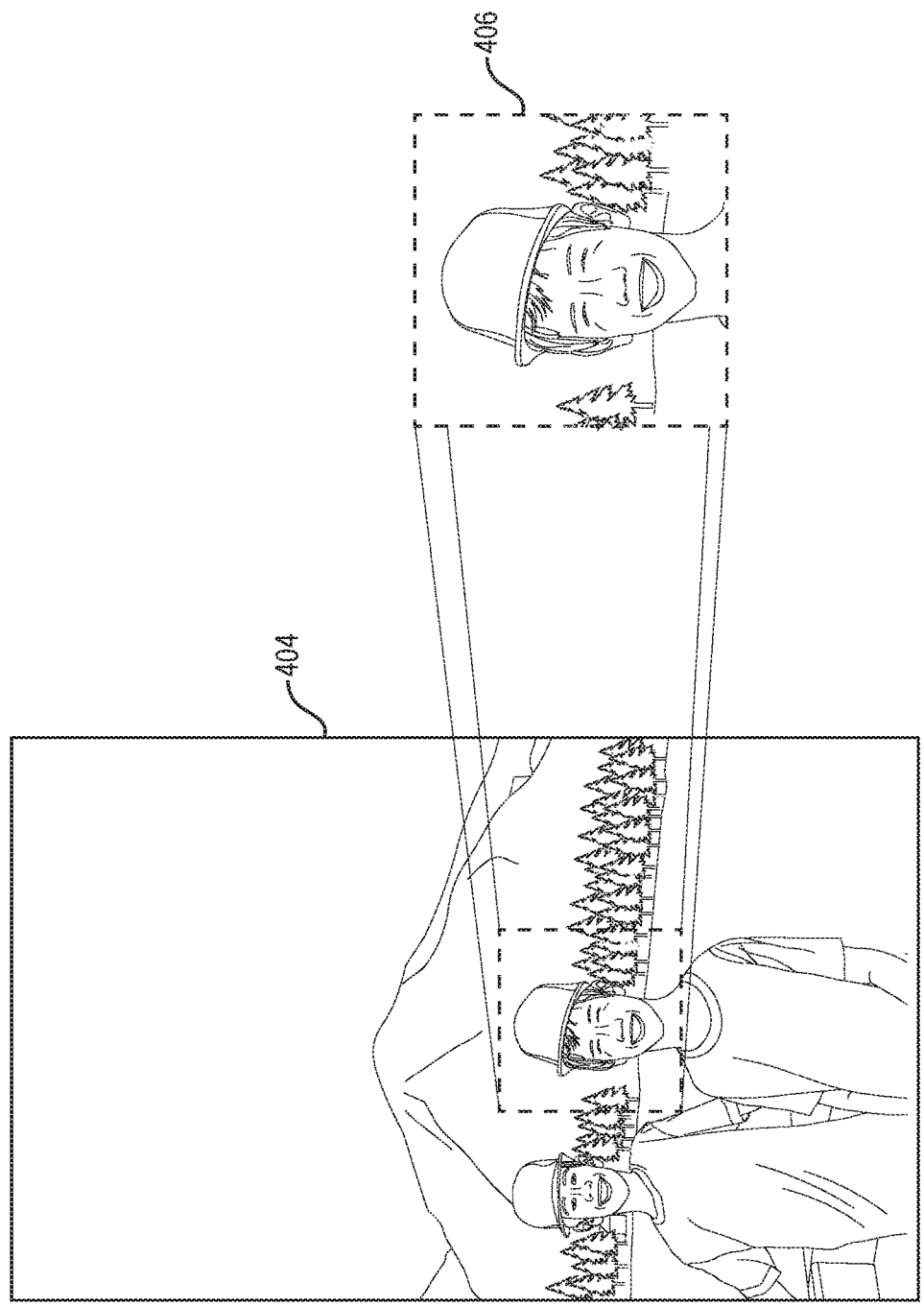

In one or more embodiments, after determining the overlapping portion 402, the image management system 102 generates a focused preview image. FIG. 4C illustrates a digital image 404 captured from the real-world scene of FIGS. 3A and 3B used to generate the saliency map 400, and FIG. 4D illustrates the resulting focused preview image 406 that the image management system 102 generates from the digital image 404. Specifically, the image management system 102 centers on the overlapping portion 402 and then generates the focused preview image 406 centered on the overlapping portion 402.

In one or more embodiments, the image management system 102 centers on the overlapping portion 402 by first determining a center of the overlapping portion 402. For example, the image management system 102 can determine a center of the overlapping portion 402 by identifying a pixel that is within the center of the overlapping portion 402 as determined by a height and/or width of the overlapping portion 402. The image management system 102 can then generate the focused image preview 406 centered on the identified pixel. To illustrate, the image management system 102 can generate a focused preview image 406 of predetermined size (e.g., as may be standard for thumbnail or other preview images for the image management system 102 or other photo/image management application) that has the identified pixel at the center.

Alternatively, the image management system 102 can center the focused preview image 406 on the overlapping portion 402 as a whole. For instance, the image management system 102 can center the focused preview image 406 on the overlapping portion 402 as a whole by determining the overlapping portion, creating a bounding box around the overlapping portion, and then extending the boundaries of the bounding box in the x-direction and y-direction (in both positive and negative directions) until the bounding box reaches the size dimensions of a focused preview image 406. In an additional example, the image management system 102 uses a centering algorithm that uses the size and the shape of the overlapping portion 402 within the focused preview image to determine a balanced centering of the overlapping portion 402.

The image management system 102 can also take into account the boundaries of the digital image 404 when generating the focused preview image 406. For example, the overlapping portion may be near an edge of the digital image such that the image management system 102 is unable to center the focused preview image 406 fully on the overlapping portion 402. The image management system 102 can attempt to center the overlapping portion 402, and if the image management system 102 passes a boundary of the digital image 404, the image management system 102 can translate the focused preview image 406 in a single direction until the focused preview image 406 is no longer past the boundary. If the image management system 102 passes two boundaries (e.g., a corner of the digital image), the image management system 102 can translate the focused preview image 406 in two directions until the focused preview image 406 is no longer past both boundaries.

Once the image management system 102 has generated the focused preview image 406 illustrated in FIG. 4D, the image management system 102 can provide the focused preview image 406 for display within an image viewing/management application. For example, in the embodiment of FIG. 1 in which the image management system 102 resides on remote server device(s), the image management system 102 can provide the focused preview image 406 to the client device of the user via a network connection. If the image management system 102 resides on the client device, the image management system 102 can store the focused preview image 406 in a storage location for preview images associated with the client application.

In one or more embodiments, the image management system 102 can also generate preview images even if the saliency map 400 and the focus region 304 do not overlap. In particular, the image management system 102 can attempt to identify the subject(s) of interest to the user within the digital image 404 without any overlap between the saliency map 400 and the focus region 304. In one or more embodiments, the image management system 102 determines the subject(s) of interest based solely on the focus region 304 when there is no overlap. For example, in response to determining that the saliency map 400 and the focus region 304 do not overlap, the image management system 102 can center the focused preview image 406 on the focus region 304 obtained from focus information in the metadata of the digital image 404. Thus, the resulting focused preview image 406 still uses the focus information captured at the time of the image capture.

In one or more alternative embodiments, the image management system 102 uses the saliency map 400 in combination with the focus information to center the focused preview image 406 even if the saliency map 400 and focus region 304 do not overlap. Specifically, in response to determining that the saliency map 400 and the focus region 304 do not overlap, the image management system 102 can determine a portion of the saliency map 400 that is closest to the focus region 304. For example, if the focus region 304 is near an object (e.g., a person's face) within the saliency map 400 without being on the object (or any other part of the saliency map 400), the image management system 102 can select the nearest portion for centering the focused preview image 406. The resulting focused preview image 406 can then be centered on the nearest object such as a person's face, rather than being centered directly over the focus region 304.

Similarly, even without any overlap, the image management system 102 can generate the focused preview image 406 so as to include the focus region 304 and (at least a portion of) the saliency map 400. In particular, the image management system 102 can determine a center point between the focus region 304 and the nearest portion of the saliency map 400. In another example, the image management system 102 can create a bounding box that includes the focus region 304 and at least a portion of the saliency map 400 (e.g., a predetermined area of a portion of the saliency map 400 closest to the focus region 304). The image management system 102 can then generate the focused preview image 406 by centering the focused preview image 406 at the center point or at the bounding box.

While FIGS. 4A-4D illustrate an embodiment in which the image management system 102 determines a focus region 304 in a specific location within the digital image, the image management system 102 can determine focus regions in a variety of locations within a digital image. Accordingly, the image management system 102 can generate different focused preview images (even for the same digital image) if the image management system 102 receives different focus information for the digital image.

For example, FIGS. 5A-5C illustrate a plurality of different focused preview images corresponding to a digital image 500 as a result of receiving different focus information (e.g., the image management system 102 determining different focus regions from the focus information). For example, FIG. 5A illustrates a focus region 502 being in a similar location as described above with respect to FIGS. 4A-4D (e.g., over a first person's face). As shown, the image management system 102 generates the focused preview image 504 centered at the first person's face due to the focus region 502 overlapping the corresponding saliency map that includes the first person's face.

FIG. 5B illustrates that the image management system 102 identifies a second focus region 506 (e.g., based on different focus information). Specifically, when the user captures the digital image 500, the camera device can detect the focus information located on the second user's face and store the focus information as metadata. The image management system 102 can then determine the corresponding focus region 506 and generate a focused preview image 508 based on the focus region 506 overlapping the saliency map at the second user's face. Additionally, the image management system 102 can verify that the focused preview image 508 does not extend past the boundaries of the digital image 500 when generating the focused preview image 508.

FIG. 5C illustrates an additional focused preview image 512 for the digital image 500 based on different focus information. In relation to FIG. 5C, the image management system 102 identifies focus information captured with the digital image and determines a focus region 510 (e.g., determines that the digital camera was focused on the mountain). In relation to FIG. 5C, the image management system 102 determines that the focus region 510 does not overlap any part of the saliency map (as described above). In response, the image management system 102 centers the focused preview image 512 using only the focus information (rather than the focus information and saliency map), such that the focused preview image 512 is centered on the focus region illustrated in FIG. 5C.

Accordingly, as illustrated in FIGS. 5A-5C, the image management system 102 can generate focused preview digital images specific to the focus information identified at the time a digital image is captured by a camera device. Indeed, depending on the subject of interest to the user at the capture time, the image management system 102 can generate three different focused preview images 504, 508, or 512. Indeed, unlike conventional systems, the image management system 102 utilizes is not only the contents of a digital image, but the focus information at the time a digital image is captured to generate focused preview images.

Figure 6A:
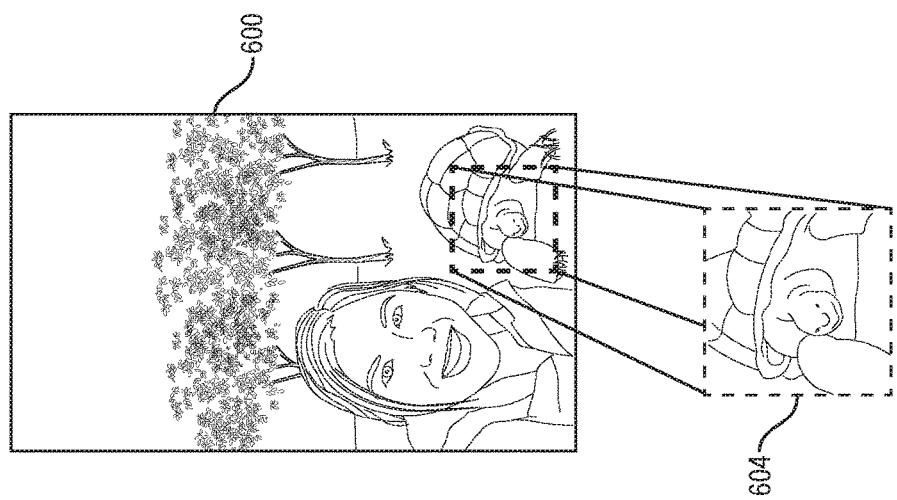
FIGS. 6A-6B illustrate a comparison of a conventional preview image and a focused preview image generated by the image management system of FIG. 1 in accordance with one or more embodiments.
Figure 6B:
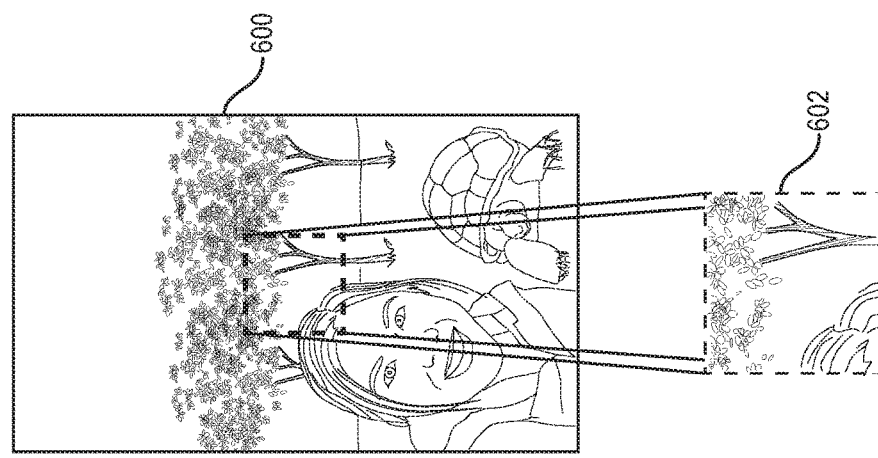

Indeed, FIGS. 6A-6B illustrate a comparison between a preview image generated using a conventional system and a focused preview image generated by the image management system 102 for a digital image 600. In particular, FIG. 6A illustrates a preview image 602 that a conventional system generates simply by determining a center of the digital image 600 and then cropping the digital image 600 to a predetermined size. As shown, the preview image 602 is centered on a portion of the digital image 600 that does not adequately portray the salient content of the digital image 600. FIG. 6B illustrates a focused preview image 604 that the image management system 102 generates by centering the focused preview image 604 on an overlapping portion of a focus region (identified from focus information for the digital image 600) and saliency map for the digital image 600. As illustrated, the focused preview image 604 provides a better indication of the content of the digital image 600 in which the user is interested by focusing on an object on which the user focused the camera device when capturing the digital image 600.

Figure 7:
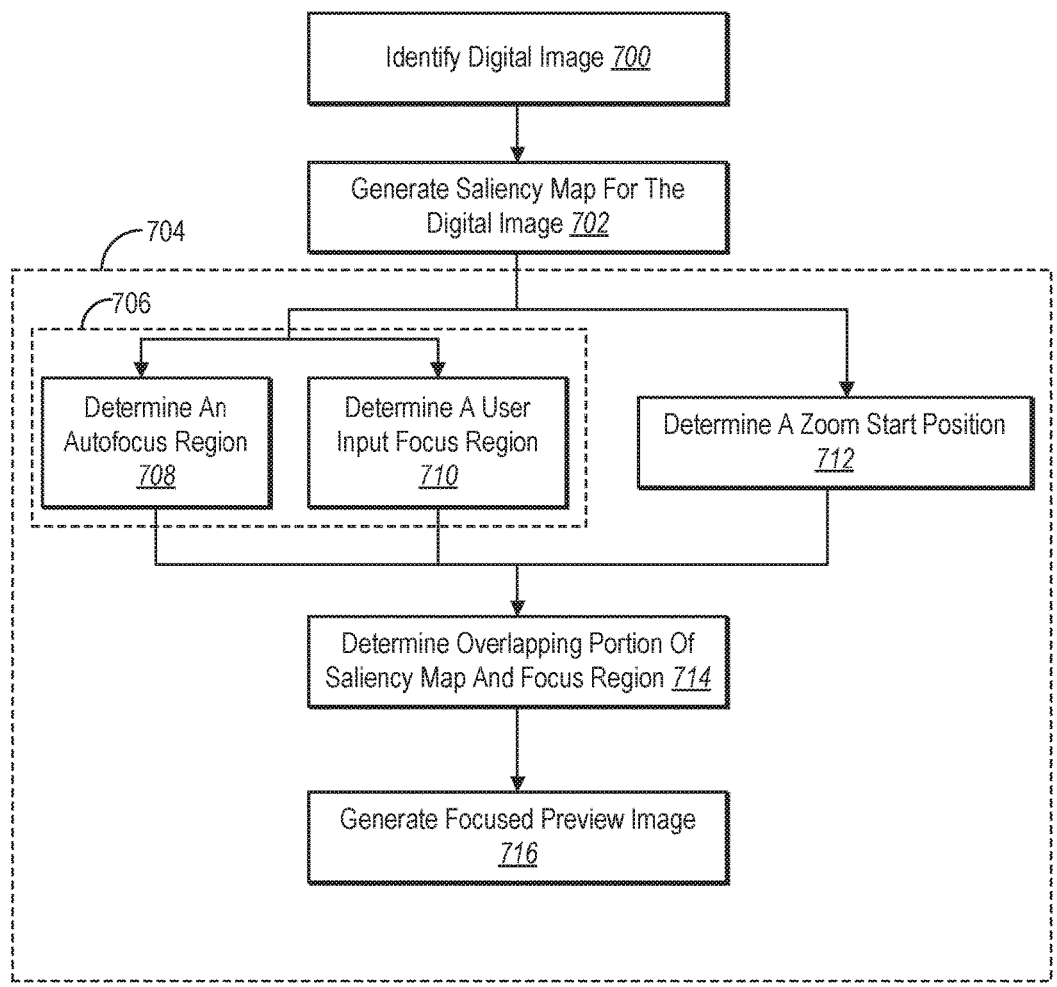
FIG. 7 illustrates a flowchart of an example algorithm for capturing focus information and generating a focused preview image for a digital image in accordance with one or more embodiments.

As described above, the image management system 102 can generate focused preview images for digital images based on focus information and a saliency map for the digital image. FIG. 7 illustrates a flowchart of an algorithm for generating focused preview images based on focus information and saliency maps of digital images. The process of FIG. 7 begins by the image management system 102 identifying a digital image 700. The image management system 102 then generates a saliency map for the digital image 702. Additionally, the process includes a step 704 for generating a focused preview image based on the saliency map and focus information for the digital image.

As described previously, the image management system 102 can identify a digital image 700 that a user has captured using a camera device. In one or more embodiments, the image management system 102 operates on server devices that communicate with the camera device (or that communicate with a client device associated with the camera device) to obtain digital images from the user. For instance, the camera device can send the digital image to the image management system 102 during a synchronization process (e.g., automated or user-initiated) that transfers digital images that were captured using the camera device and that have not already been transferred to the image management system 102. Alternatively, the image management system 102 can operate on a client device and detect any time a new image is stored on the client device (e.g., when capturing a new image).

After identifying a digital image, the image management system 102 generates a saliency map for the digital image 702. In particular, the image management system 102 generates a saliency map that indicates one or more salient objects within the digital image. As previously described with respect to FIG. 2 and FIG. 4A, the image management system 102 can use a machine-learning method to generate the saliency map. The machine-learning model can be trained on a plurality of training images, which can include previous images provided by the user and/or images provided by one or more other users associated with the image management system 102. Alternatively, the image management system 102 can use other methods of generating the saliency map, including object recognition or other image processing techniques.

The image management system 102 then proceeds with the step 704 for generating a focused preview image based on the saliency map and focus information for the digital image. As shown in FIG. 7, the image management system 102 uses focus information from the digital image to determine a focus region within the digital image. In one or more embodiments, the image management system 102 determines the focus region based on focus information indicating portions of the digital image on which to focus a camera lens/sensor when capturing the digital image 706. For example, the image management system 102 can determine an autofocus region 708 using an autofocus feature of the camera device that captured the digital image, as previously described with respect to FIG. 3A. Alternatively, the image management system 102 can determine a user input focus region 710 based on a user input into a client application that captures the digital image, as described with respect to FIG. 3B above.

In one or more alternative embodiments, the image management system 102 determines the focus region by determining a zoom position 712. Specifically, the image management system 102 can determine that a zoom operation performed in connection with capturing the digital image caused the camera device to store a zoom position as metadata with the digital image. For instance, the zoom position can include a start position of the zoom operation (or a central position of the zoom operation). The start position (and/or central position) can be based on one or more touch positions of a touch input (e.g., a pinch-in/pinch-out action) that causes the camera device to zoom in or out relative to a specific location of a digital image.

In one or more alternative embodiments, the image management system 102 determines the focus region by determining an interaction by a user with the captured digital image. For example, a user can interact with a digital image by tapping or zooming in on objects (e.g., people) within the digital image. The image management system 102 can use the interactions to determine a focus region corresponding to the position(s) of the interactions within the digital image.

After determining the focus region, the process includes determining an overlapping portion of the saliency map and the focus region 714, as described with respect to FIG. 4B. In particular, the image management system 102 determines whether the saliency map previously generated at least partially overlaps with the focus region that the image management system 102 determined from metadata of the image. Additionally, the image management system 102 can identify the position of the overlapping portion within the digital image for use in generating a focused preview image for the digital image.

The image management system 102 then generates a focused preview image 716 for the digital image. In particular, the image management system 102 can crop the digital image based on the focus region and the saliency map. For example, the image management system 102 can center the focused preview image at the overlapping portion (e.g., based on the shape and/or size characteristics of the overlapping portion or based on one or more pixels at a center of the overlapping portion), as described above with respect to FIGS. 4C and 4D. The image management system 102 can also constrain the focused preview image to the boundaries of the digital image. Once the image management system 102 has determined the center of the focused preview image, the image management system 102 can generate the focused preview image by cropping the digital image (or a copy of the digital image) to a predetermined size for focused preview images.

Figure 8:
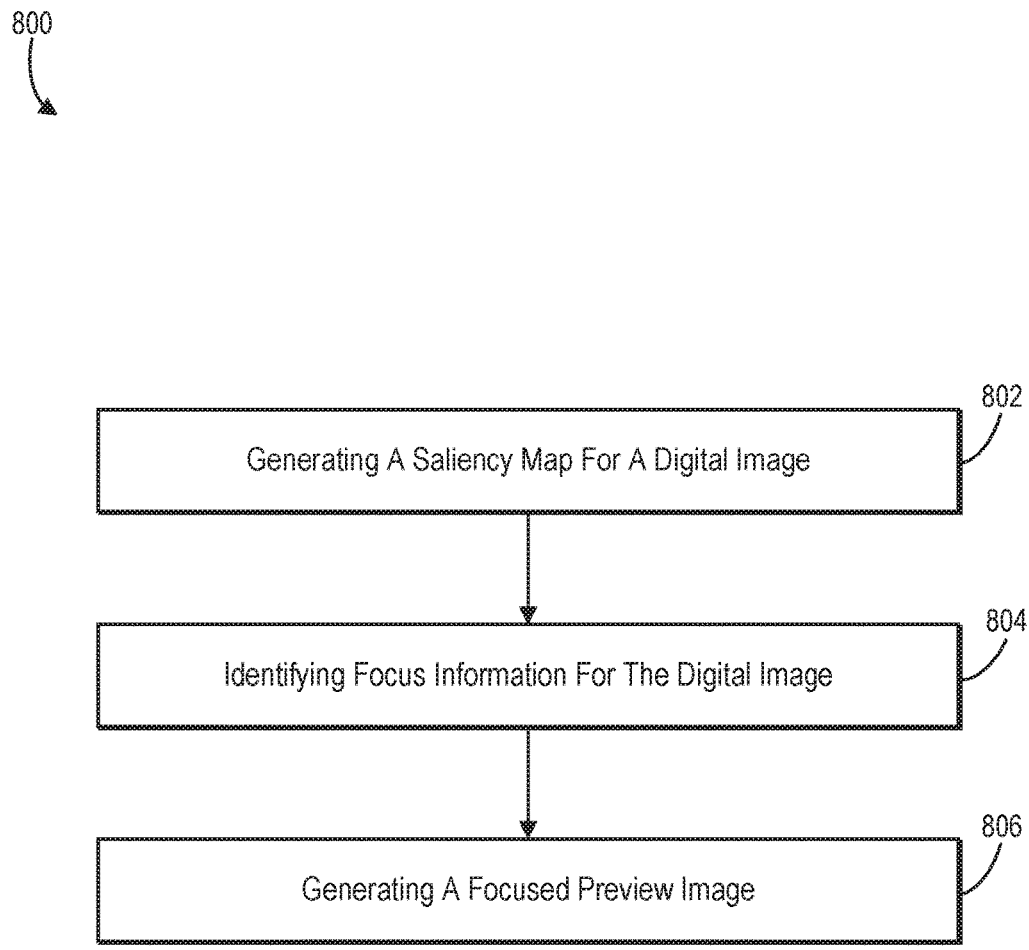
FIG. 8 illustrates a flowchart of a series of acts in a method of generating intelligent personalized preview digital images in accordance with one or more embodiments.

Turning now to FIG. 8, this figure illustrates a flowchart of a series of acts 800 of focused preview image generation in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

The series of acts 800 includes an act 802 of generating a saliency map for a digital image. For example, act 802 involves generating a saliency map for a digital image, the saliency map indicating one or more objects portrayed within the digital image. Act 802 can involve generating the saliency map utilizing a machine-learning model trained based on a plurality of digital training images and training saliency maps.

The series of acts 800 also includes an act 804 of identifying focus information for the digital image. For example, act 804 involves identify, for the digital image, focus information captured by a camera device at a time that the digital image was captured. Act 804 can involve determining a focus region within the digital image by determining at least one pixel corresponding to a region on which to focus the camera device when capturing the digital image. For example, act 804 can involve determining the focus region as a region of predetermined size centered at the at least one pixel.

Act 804 can also involve determining the focus region based on a touch input to the camera device. Act 804 can alternatively involve determining the focus region based on an autofocus feature of the camera device. Act 804 can alternatively involve identifying the zoom operation based on a zoom operation performed in connection with capturing the digital image. For example, act 804 can involve determining a position within the digital image corresponding to the zoom operation performed in connection with capturing the digital image.

As part of act 804, or as an additional act, the series of acts 800 can include identifying at least one of the focus region or the focus information from metadata stored with the digital image at the time of capture, and utilizing the focus information from the metadata to determine the focus region. For example, the series of acts 800 can include storing the focus information as Extensible Metadata Platform (XMP) data for the digital image.

Additionally, the series of acts 800 includes an act 806 of generating a focused preview image. For example, act 806 involves generating a focused preview image based on the saliency map and the focus information captured by the camera device at the time that the digital image was captured. Act 806 can involve determining a focus region based on the focus information captured by the camera device at the time that the digital image was captured. For example, act 806 can involve determining at least one pixel corresponding to a region on which to focus the camera device when capturing the digital image.

Act 806 can then involve determining an overlapping portion of the saliency map and the focus region, and cropping the digital image to center the focused preview image based on the overlapping portion. For instance, act 806 can involve centering the focused preview image based on the overlapping portion by extending the overlapping portion vertically and horizontally subject to boundaries of the digital image to match a preview image aspect ratio. Alternatively, act 806 can involve determining that the saliency map does not overlap with the focus information, and centering the focused preview image using only the focus information.

Figure 9:
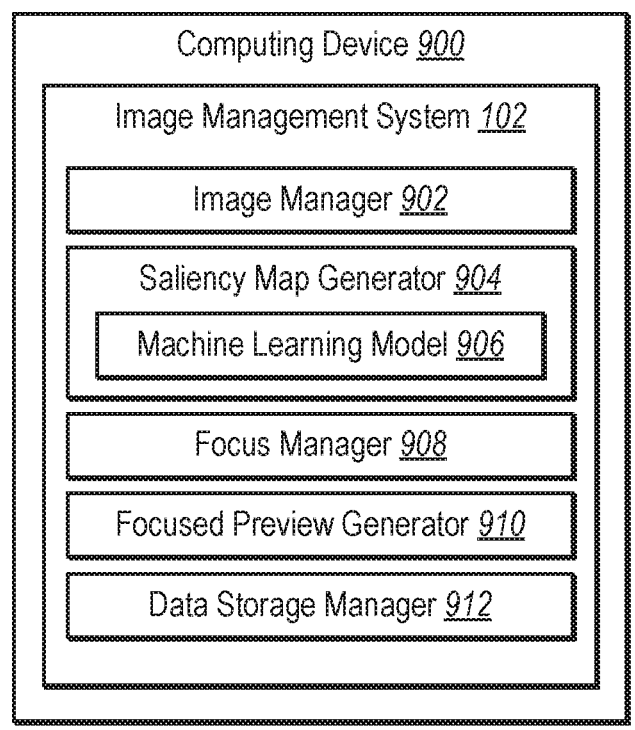
FIG. 9 illustrates a schematic diagram of the image management system of FIG. 1 in accordance with one or more embodiments.

FIG. 9 illustrates a detailed schematic diagram of an embodiment of the image management system 102 of FIG. 1. As shown, the image management system 102 can be part of computing device(s) 900. Additionally, the image management system 102 can include, but is not limited to, an image manager 902, a saliency map generator 904 (which includes a machine-learning model 906), a focus manager 908, a focused preview generator 910, and a data storage manager 912. The image management system 102 can be implemented on any number of computing devices (e.g., the server device(s) 106 and/or the client device 104). For example, the image management system 102 can be implemented in a distributed system of server devices for managing digital images captured by one or more users. Alternatively, the image management system 102 can be implemented on a single computing device such as a client device of a user.

In one or more embodiments, each of the components of the image management system 102 are in communication with one another using any suitable communication technologies. Additionally, the components of the image management system 102 can be in communication with one or more other devices including a client device of a user, as illustrated in FIG. 1. It will be recognized that although the components of the image management system 102 are shown to be separate in FIG. 9, any of the subcomponents may be combined into fewer components, such as into a single component, or divided into more components as may serve a particular implementation. Furthermore, although the components of FIG. 9 are described in connection with the image management system 102, at least some of the components for performing operations in conjunction with the image management system 102 described herein may be implemented on other devices within the environment.

The components of the image management system 102 can include software, hardware, or both. For example, the components of the image management system 102 can include one or more instructions stored on a computer-readable storage medium and executable by processors of one or more computing devices (e.g., the computing device(s) 900). When executed by the one or more processors, the computer-executable instructions of the image management system 102 can cause the computing device(s) 900 to perform the image management methods described herein. Alternatively, the components of the image management system 102 can comprise hardware, such as a special purpose processing device to perform a certain function or group of functions. Additionally or alternatively, the components of the image management system 102 can include a combination of computer-executable instructions and hardware.

Furthermore, the components of the image management system 102 performing the functions described herein with respect to the image management system 102 may, for example, be implemented as part of a stand-alone application, as a module of an application, as a plug-in for applications including content management applications, as a library function or functions that may be called by other applications, and/or as a cloud-computing model. Thus, the components of the image management system 102 may be implemented as part of a stand-alone application on a personal computing device or a mobile device. Alternatively or additionally, the components of the image management system 102 may be implemented in any application that allows creation and delivery of marketing content to users, including, but not limited to, applications in ADOBE® CREATIVE CLOUD®, such as ADOBE® PHOTOSHOP®, ADOBE® LIGHTROOM®, and ADOBE® BRIDGE. "ADOBE", "CREATIVE CLOUD", "PHOTOSHOP", "LIGHTROOM", and "ADOBE BRIDGE" are trademarks or registered trademarks of Adobe Systems Incorporated in the United States and/or other countries.

As mentioned, the image management system 102 can include an image manager 902 to facilitate the management of digital images associated with one or more users. Specifically, the image manager 902 can manage a library of digital images that a user has captured (e.g., with computing device 900 or with a separate device and then provided to the computing device 900). The image manager 902 can maintain a listing of the digital images associated with the user, including metadata associated with the digital images. The image manager 902 can also maintain a database of user permissions and ownership associated with the digital images (e.g., maintaining digital images for a plurality of users separately such that only an image owner, or an authorized user, can access the digital images).

The image management system 102 includes a saliency map generator 904 to facilitate the generation of a saliency map for each digital image in a user's collection of digital images. In particular, the saliency map generator 904 can generate saliency maps that indicate the salient objects within each digital image. For instance, the saliency map generator 904 can communicate with the image manager 902 to access a plurality of images for a user to generate saliency maps for the digital images. As previously mentioned, the saliency map generator 904 can include a machine-learning model 906 that allows the image management system 102 to produce accurate saliency maps and continuously improve the saliency maps for future digital images.

The image management system 102 further includes a focus manager 908 to identify focus information for digital images and determine focus regions based on the focus information. Specifically, the focus manager 908 can access metadata of digital images managed by the image manager 902 to determine the focus information for each digital image. After identifying the focus information, the focus manager 908 determines the focus region for each digital image. For instance, as mentioned previously, the focus manager 908 may determine the focus region in a variety of ways, and based on a variety of criteria.

Additionally, the image management system 102 includes a focused preview generator 910. The focused preview generator 910 generates the focused preview image for each image based on the saliency map generated by the saliency map generator 904 and the focus region determined by the focus manager 908. To illustrate, the focused preview generator 910 determines an overlapping portion of the saliency map and the focus region for a digital image and then crops the digital image to center on the overlapping portion. The focused preview generator 910 can then communicate with the image manager 902 to store or otherwise associate the focused preview image with the corresponding digital image.

The image management system 102 also includes a data storage manager 912 (that comprises a non-transitory computer memory) that stores and maintains data associated with focused preview image generation. For example, the data storage manager 912 can include a database that maintains the digital images for each user, as determined by the image manager 902. The data storage manager 912 can also store metadata with the digital images, including the focus information that was captured at the same time the digital images were captured. The data storage manager 912 can further store the focused preview images that the focused preview generator 910 created for the images associated with a user. Additionally, the data storage manager 912 can store information associated with the users, such as user profiles, authentication information, or the like. Furthermore, the data storage manager 912 can store one or more machine learning models (e.g., the machine learning model 906).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
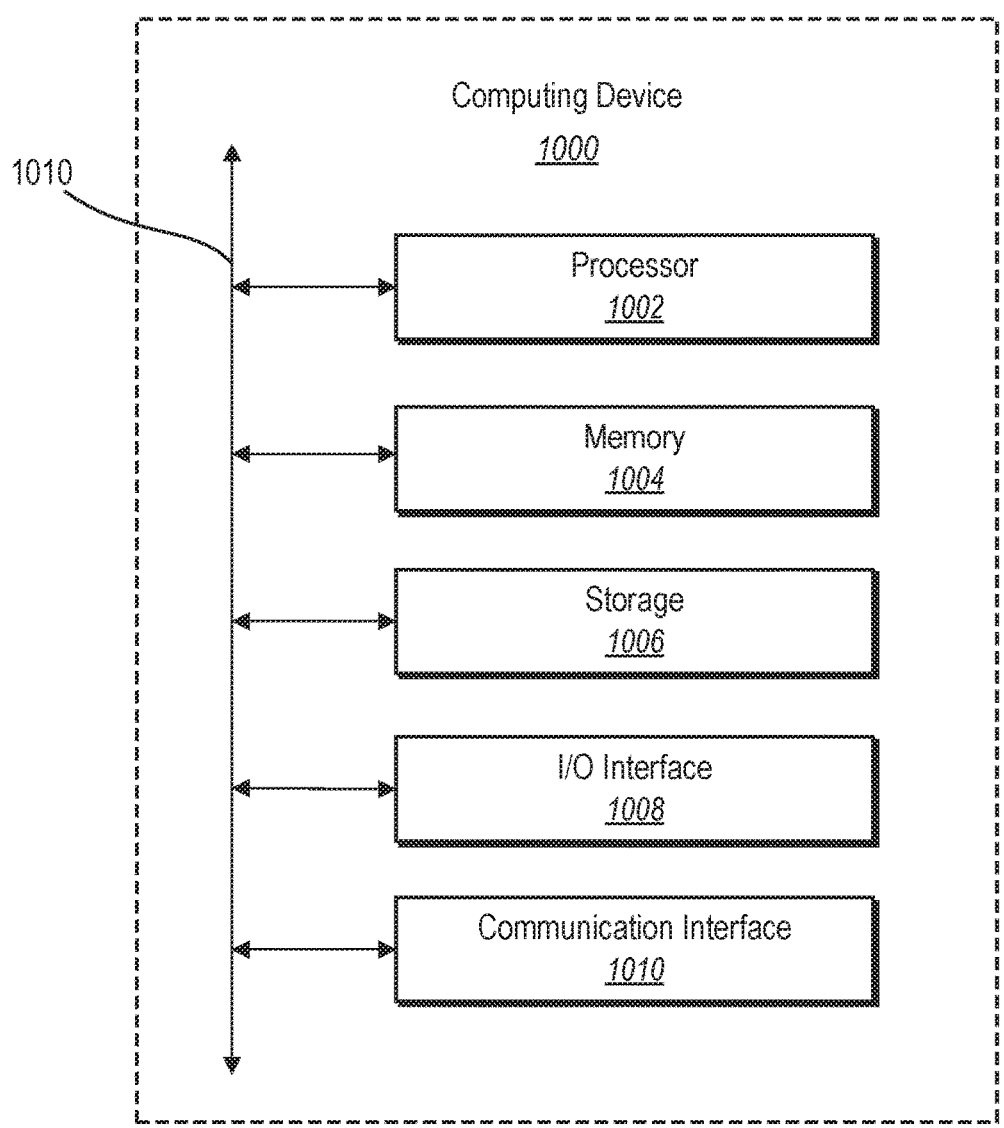
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the image management system 102. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the image management and focused preview image generation process can allow a plurality of devices (e.g., a client device and server devices) to exchange information using various communication networks and protocols for sharing information such as digital images, metadata associated with the digital images, and focused preview images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for modifying digital images, a system for generating intelligent personalized preview digital images comprising:
    at least one processor; and
    a non-transitory computer memory comprising a machine-learning model trained based on a plurality of digital training images and training saliency maps; and
    instructions that, when executed by the at least one processor, cause the system to:
        generate a saliency map for a digital image utilizing the machine-learning model, the saliency map indicating one or more objects portrayed within the digital image;
        identify a focus region based on focus information from metadata of the digital image, the focus information captured and stored as the metadata of the digital image by a camera device at a time that the digital image was captured; and
        crop the digital image to generate a focused preview image by:
            determining that the saliency map and the focus region identified based on the focus information at least partially overlap to create an overlapping portion; and
            centering the focused preview image based on the overlapping portion of the saliency map and the focus region.

2. The system as recited in claim 1, further comprising instructions that, when executed by the at least one processor, cause the system to identify the focus region based on the focus information by determining, from the metadata of the digital image, at least one pixel within the digital image corresponding to a distance at which the camera device focused when capturing the digital image.

3. The system as recited in claim 2, further comprising instructions that, when executed by the at least one processor, cause the system to determine that the focus information from the metadata of the digital image comprises the at least one pixel based on a touch input to the camera device.

4. The system as recited in claim 2, further comprising instructions that, when executed by the at least one processor, cause the system to determine that the focus information from the metadata of the digital image comprises the at least one pixel based on an autofocus feature of the camera device.

5. The system as recited in claim 2, further comprising instructions that, when executed by the at least one processor, cause the system to determine that the focus information from the metadata of the digital image comprises the at least one pixel based on a position within the digital image corresponding to a zoom operation performed in connection with capturing the digital image.

6. The system as recited in claim 2, further comprising instructions that, when executed by the at least one processor, cause the system to determine the focus region as a region of predetermined size centered at the at least one pixel.

7. The system as recited in claim 1, further comprising instructions that, when executed by the at least one processor, cause the system to determine that a position of an input indicating how to focus a camera lens when capturing the digital image is stored in the metadata for the digital image.

8. The system as recited in claim 1, further comprising instructions that, when executed by the at least one processor, cause the system to center the focused preview image based on the overlapping portion by:
    determining a center of the overlapping portion based on a size and a shape of the overlapping portion; and
    cropping the digital image to center the focused preview image based on the center of the overlapping portion.

9. The system as recited in claim 1, further comprising instructions that, when executed by the at least one processor, cause the system to center the focused preview image based on the overlapping portion by extending the overlapping portion vertically and horizontally subject to boundaries of the digital image to match a preview image aspect ratio.

10. A non-transitory computer readable storage medium comprising instructions that, when executed by at least one processor, cause a computer system to:
    generate a saliency map for a digital image, the saliency map indicating one or more objects portrayed within the digital image;
    identify, for the digital image, focus information from metadata of the digital image, the focus information captured and stored as the metadata of the digital image by a camera device at a time that the digital image was captured; and
    crop the digital image to generate a focused preview image by:
        determining that the saliency map and a focus region identified based on the focus information at least partially overlap to create an overlapping portion; and
        centering the focused preview image based on the overlapping portion of the saliency map and the focus region.

11. The non-transitory computer readable storage medium as recited in claim 10, further comprising instructions that, when executed by the at least one processor, cause the computer system to generate the focused preview image by:
    determining a center of the overlapping portion based on a size and a shape of the overlapping portion; and
    cropping the digital image to center the focused preview image based on the center of the overlapping portion.

12. The non-transitory computer readable storage medium as recited in claim 11, further comprising instructions that, when executed by the at least one processor, cause the computer system to determine the focus region based on the focus information by determining, from the metadata of the digital image, at least one pixel corresponding to a region on which the camera device focused when capturing the digital image.

13. The non-transitory computer readable storage medium as recited in claim 12, further comprising instructions that, when executed by the at least one processor, cause the computer system to determine that the focus information from the metadata of the digital image comprises the focus region based on a surface area of a touch input to the camera device.

14. The non-transitory computer readable storage medium as recited in claim 12, further comprising instructions that, when executed by the at least one processor, cause the computer system to determine that the focus information from the metadata of the digital image comprises the focus region based on an autofocus feature of the camera device.

15. The non-transitory computer readable storage medium as recited in claim 11, further comprising instructions that, when executed by the at least one processor, cause the computer system to identify determine that the focus information from the metadata of the digital image comprises a focus region based on a position within the digital image corresponding to a zoom operation performed in connection with capturing the digital image.

16. The non-transitory computer readable storage medium as recited in claim 11, further comprising instructions that, when executed by the at least one processor, cause the computer system to: determine that a position of an input indicating how to focus a camera lens when capturing the digital image is stored in the metadata for the digital image.

17. In a digital medium environment for modifying digital images, a computer-implemented method of generating intelligent personalized preview digital images comprising:
identifying a digital image captured by a camera device;
generating a saliency map for the digital image, the saliency map indicating one or more objects portrayed within the digital image; and
a step for generating a focused preview image based on the saliency map and focus information for the digital image.

18. The computer-implemented method as recited in claim 17, wherein the step for generating the focused preview image comprises determining the focus information by determining, from metadata of the digital image, at least one pixel within the digital image corresponding to a distance at which to focus the camera device when capturing the digital image.

19. The computer-implemented method as recited in claim 18, wherein the step for generating the focused preview image comprises determining that the focus information from the metadata of the digital image comprises the at least one pixel based on a position within the digital image at which a zoom operation is performed in connection with capturing the digital image.

20. The computer-implemented method as recited in claim 17, further comprising, providing the focused preview image for display via a computing device together with a plurality of additional focused preview images.

* * * * *